Oct. 27, 1936.  D. GREGG  2,058,440

VIBRATION ABSORBING CENTRIFUGAL CLUTCH

Filed Aug. 12, 1931  2 Sheets-Sheet 1

INVENTOR
David Gregg
BY
F. B. Smith
ATTORNEY

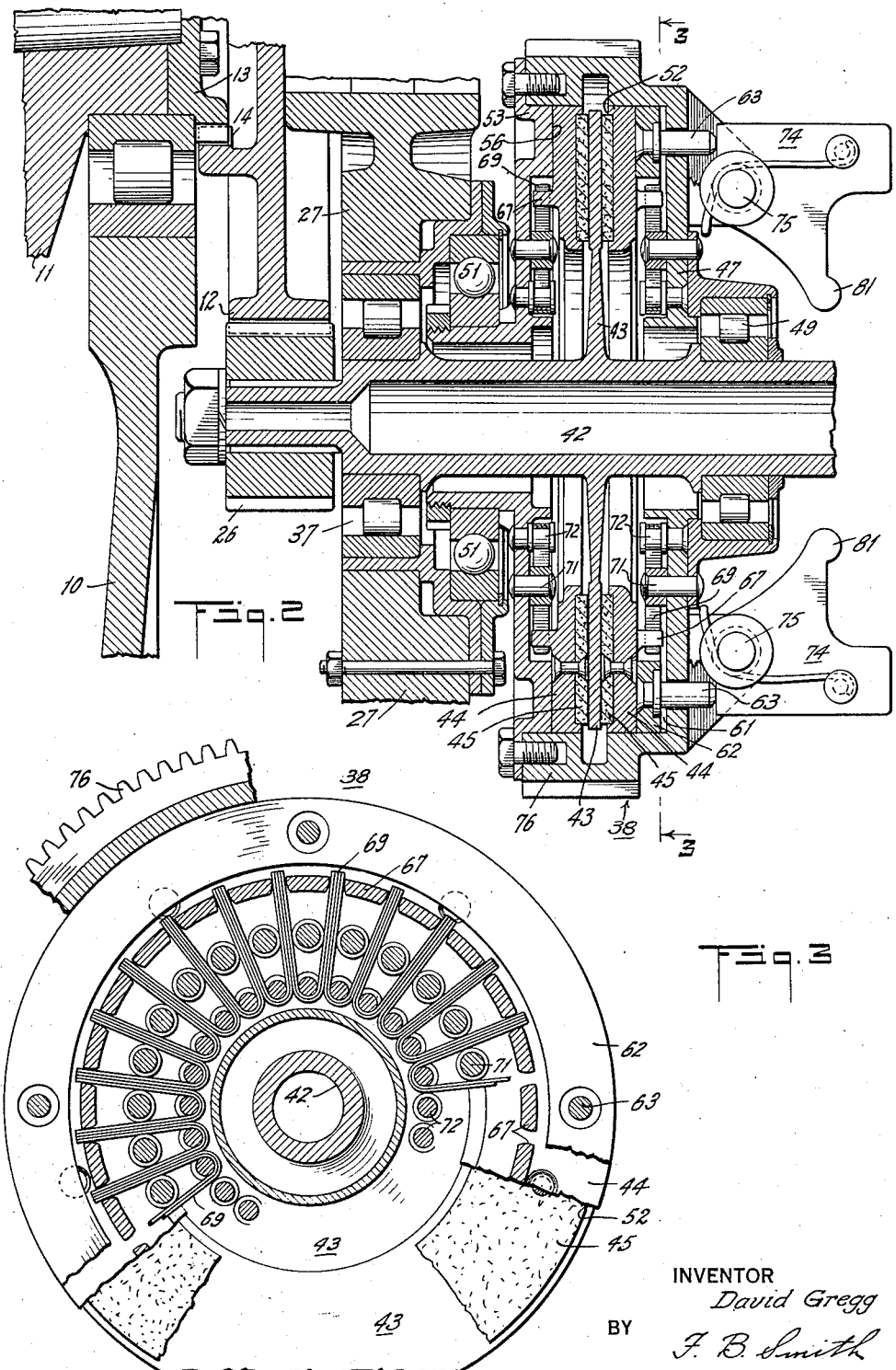

Patented Oct. 27, 1936

2,058,440

UNITED STATES PATENT OFFICE 2,058,440

VIBRATION ABSORBING CENTRIFUGAL CLUTCH

David Gregg, Caldwell, N. J., assignor to Bendix Research Corporation, East Orange, N. J., a corporation of Indiana Application August 12, 1931, Serial No. 556,685

14 Claims. (Cl. 192—103)

This invention relates to a novel driving means for engine accessories and is illustrated in embodying an engine supercharger driving mechanism.

An object of the invention is to provide an accessory driving mechanism in which the torque capacity is substantially equal to that required to drive the accessory under normal driving conditions and which shields the accessory from abnormal forces and loads.

Another object of the invention is to provide an engine accessory driving mechanism which dampens the vibrational forces that otherwise would be transmitted between the engine and the accessory.

Another object of the invention is to provide a high speed driving mechanism for an engine accessory that reduces the driving force fluctuations either of momentary or extended duration.

Another object of the invention is to provide a driving mechanism for an engine accessory in which a unitary device is included that functions as a centrifugal clutch, as a flexible joint, and as a vibration dampener.

Another object of the invention is to provide a centrifugal clutch for an engine accessory that acts as an overload release and a vibration dampener.

Another object of the invention is to provide a driving mechanism for an engine supercharger that has a torque capacity which varies with the supercharger speed and which has inherent vibration dampening characteristics irrespective of the accessory speed.

Another object of the invention is to provide a driving mechanism for an engine accessory in which the accessory may be driven at two different speed ratios and in which the driving mechanism is adapted to dampen the vibrational forces which otherwise would be transmitted between the engine and the accessory.

Other valuable features of the invention will be apparent from the following description of a preferred embodiment which has been illustrated in the accompanying drawings, in which:

Fig. 2 is an enlarged sectional view of the improved clutch; and,

Fig. 3 is a sectional view taken on the line 3—3 of Fig. 2.

Figure 1:
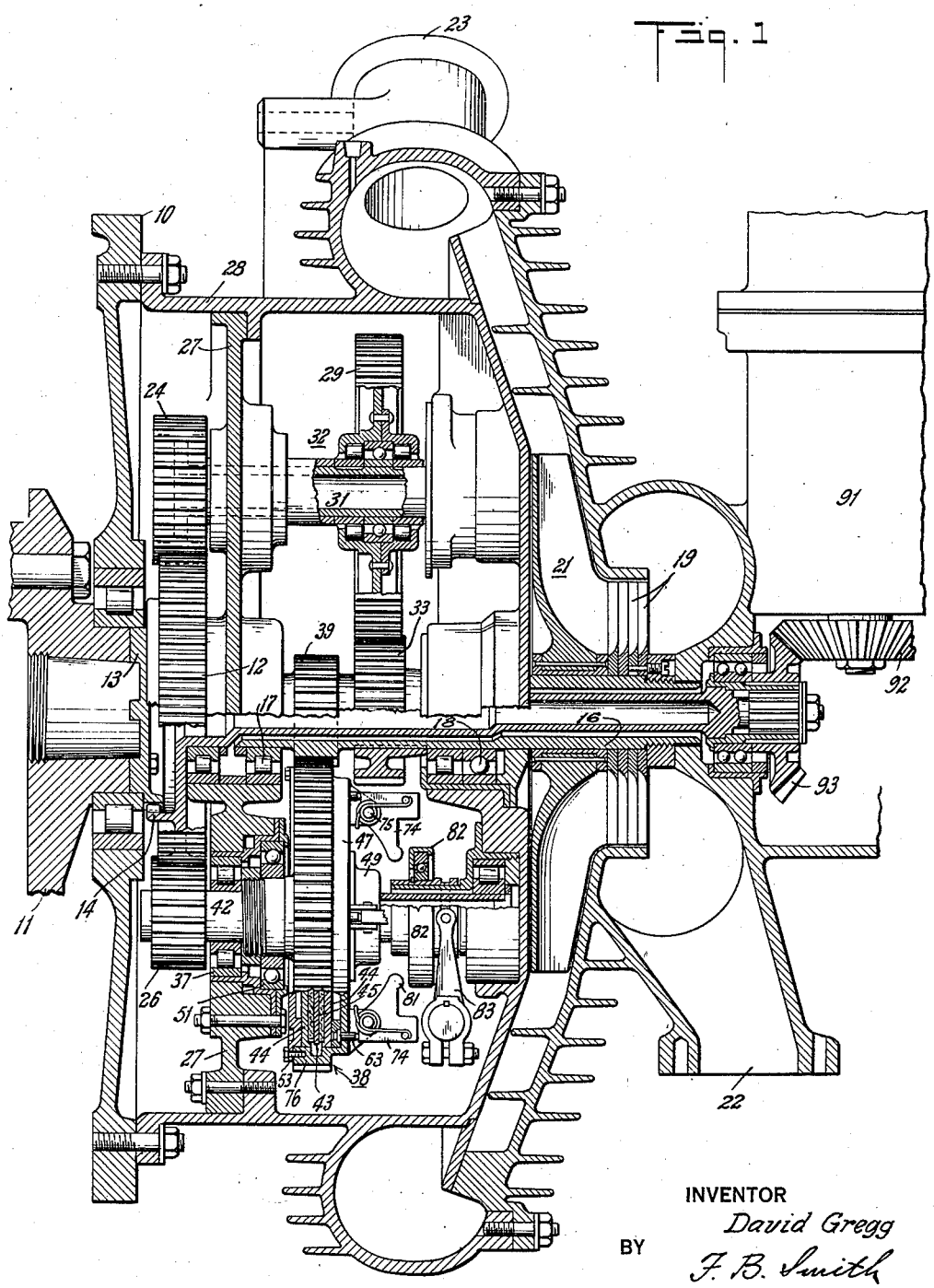
Fig. 1 is a vertical cross-section of an engine supercharger having a driving mechanism constructed according to the present invention.

For illustrative purposes, the novel driving mechanism has been shown in connection with an engine driven supercharger. A portion of the engine crank case is shown at 10, in which is rotatably mounted the engine crank shaft 11 operatively connected to driving gear 12 by any desired means, such as plate 13, having a toothed connection with gear 12 at 14. Hollow driving shaft 16 is rotatably mounted in suitable bearings 17 and 18 in the supercharger housing and carries fan blades 19 and impeller 21 for imparting velocity and pressure to air or other gases entering the supercharger at inlet 22, from whence it is forced outwardly through discharge passage 23 to the cylinders of the engine (not shown).

Gear 12 is meshed with pinions 24 and 26 respectively, each of which is the driving gear for an intermediate gear train between crank shaft 11 and supercharger shaft 16. Gear 24 is the driving member of the slow speed gear train and is rotatably mounted in the transverse web member 27 in the housing 28 of the supercharger transmission gearing. The other members of the slow speed gear train include gear 29 secured to gear 24 by shaft 31 through the intermediary of an overrunning clutch 32, which permits gear 29 to receive torque from shaft 31 in one direction only and to overrun the shaft if torque be applied in the opposite direction.

Pinion 33 secured to supercharger shaft 16 is in constant mesh with gear 29, and in the normal slow speed running of the supercharger the power is transmitted from gear 12 to pinion 24 and is transmitted therefrom by shaft 31 through overrunning clutch 32 to gear 29 and supercharger pinion 33.

Pinion 26, as hereinbefore stated, is also meshed with gear 12 and is secured to shaft 42 which is rotatably mounted in web 27 by bearing 37, the outer end of shaft 42 being operatively connected to clutch gear 38, the construction of which will be hereinafter more fully described, it being sufficient at this point to state that in the operation of the supercharger by the slow speed mechanism, the clutch gear 38 is disconnected from shaft 42.

The clutch gear generally designated by 38 is meshed with shaft pinion 39 and frictionally driven by a hollow shaft 42 splined or otherwise secured to pinion 26. Hollow shaft 42 is provided with a radially extending disc 43 integral with or otherwise secured thereto and on opposite side of which are annular frictional members 44 having fibrous or other suitable faces 45 in frictional contact with the disc 43. Clutch housing 47 is mounted on hollow shaft 42 by bearing 49 and in the transmission case by bearing 51 and preferably locates the annular friction members 44 by contacting with their periphery at 52. Clutch gear 38 has its web or wall 53 extended inwardly to provide a supporting surface 56 having a frictional contact with the outer surface of friction member 44. At the opposite side of the clutch gear a clearance space 61 is provided, within which is slidably mounted an annular pressure member 62 to which are secured pins 63 slidably mounted in suitable openings formed in the outer wall 47 of the clutch gear. Friction members 44 are also provided with axially extending projections 67 which extend between the spaced legs of U-shaped springs 69 which may be laminated, if desired, and are positioned on the housing wall 47 by axially extending pins 71 and 72 secured to the gear housing in any desired manner. Centrifugal weights 74 are pivotally mounted on the gear housing at 75 and arranged to be thrown outwardly by centrifugal force to contact with pins 63 and force pressure member 62 toward supporting face 56 and clamp disc 43 and annular members 44 between the pressure ring and the opposite face of the gear housing, the side walls 53 and 47 and toothed rim 76 of which form an enclosure for all of the frictional members.

Inwardly extending projections 81 are provided on weights 74 which are adapted to contact thrust collar 82, which may be moved toward the left as shown in Fig. 1 by manually operated lever 83 and rotate weights 74 about the pivotal points 75 to disengage the housing from shaft 42 during the operation of the supercharger by the slow speed gear train.

In the operation of the supercharger, impeller 21 is driven by the slow speed gear train, hereinbefore described, up to any desired engine speed, it being understood that during the low speed gear operation thrust collar 82 is in position to hold centrifugal weights 74 in their inner position and prevent the engagement of clutch gear 38 with its driving shaft 42. Under conditions of low altitude or comparatively high barometric pressure, the low speed driving train may be sufficient to enable the engine to maintain its desired power, but under low barometric pressure, it may be desirable to increase the supercharger speed, and under these conditions, thrust member 82 is moved toward the right by manually operated lever 83 and weights 74 are released and may be thrown outwardly by the rotating clutch gear 38, which is in constant mesh with pinion 39 secured to the supercharger shaft 16. Outward movement of the weights forces pressure ring 62 inwardly to clamp disc 43 between the annular friction members 44 and connect clutch gear 38 to the driving shaft 42.

Increased speed of the supercharger causes the centrifugal force of weights 74 to be increased and exert additional pressure upon the friction members, and with a suitable selection of weights and leverages, the torque capacity of the clutch gear 38 increases in substantially the same ratio as the driving torque of the supercharger increases.

It is desirable that the frictional surfaces of pressure member 62 and pressure plate 56 be selected with frictional coefficients of such value that slippage will occur between the frictional members 44 and the pressure plate 62 or pressure surface 56 prior to slippage between the members 44 and disc 43, which arrangement enables the inner surfaces to act as the main driving members and the outer surfaces to act as a vibration dampening device.

With the foregoing ratio of frictional coefficients, the inner friction members would not operate satisfactorily as driving members if some provision were not made for limiting or restraining the relative movement of the outer members, and to counteract this tendency, the U-shaped springs are disposed between the gear housing and the projections 67 on the friction members 44 which tend to hold the outer friction members in the position illustrated in Fig. 2 and to restore them to this position when they have been displaced by variations in driving torque which ordinarily arise from torsional vibration in either the engine or supercharger shafts. These variations in torque are usually of momentary duration and occur in both directions, either direction of movement being counteracted and restrained by the flexing of the U-shaped springs 69.

Any suitable device, such as motor 91, may be used as a convenient means for starting the engine through gears 92 and 93, the construction of the starting device being well known and forms no part of the present invention.

It will be readily understood by the foregoing description that a novel transmission mechanism for a supercharger has been provided by which the supercharger or other engine accessory may be driven selectively by two gear trains having relatively different gear ratios.

It will also be understood that a change in gear ratios may be readily made by operation of the manually operated lever 83 which will release the centrifugal weight 74 and drive the supercharger at an increased speed, the low speed gear train being rendered inoperative by the overrunning clutch 32. The torsional vibration is not as prevalent during low speed operation as in high speed operation, and therefore the vibration dampening centrifugally operated clutch is only incorporated in the high speed train, but if desired, a similar mechanism may be used in connection with the low speed driving mechanism which will also relieve the driving members from the forces due to torsional vibration and provide a driving means in which the torque capacity is substantially proportional to the speed of the supercharger.

While a preferred embodiment of the invention has been illustrated and described, it is understood that this showing and description are illustrative only, and that the invention is not regarded as limited to the form shown and described, or otherwise, except by the terms of the following claims:

What is claimed is:

1. In a friction clutch for connecting a driving element to a driven element, two pairs of friction surfaces of different torque capacities arranged in series, resilient means opposing relative movement of the surfaces having the less capacity, and common means for increasing the contact pressure on all of said surfaces as the speed of the clutch is increased.

2. In a friction clutch for connecting a driving element to a driven element, two pairs of friction surfaces of different torque capacities arranged in series, resilient means opposing relative movement of the surfaces having the less capacity, and means for increasing the torque capacity of both pairs of surfaces as the speed of the clutch is increased.

3. In a friction clutch for connecting a driving element to a driven element, two pairs of friction surfaces of different torque capacities arranged in series, means for limiting relative movement of the pair of surfaces having the less torque capacity and centrifugal weights rotatable with the clutch adapted to increase the contact pressure on all of said surfaces as the clutch speed is increased.

4. In a friction clutch for connecting a driving element to a driven element, two pairs of friction surfaces of different torque capacities arranged in series, means for limiting relative movement of the pair of surfaces having the less torque capacity and centrifugal weights rotatable with the clutch adapted to increase the friction of both pairs of surfaces as the clutch speed is increased.

5. In a clutch for connecting a driving element to a driven element, the combination of a friction member adapted to be secured to one element, a second friction member coacting with the first member, a housing for the members adapted to be operatively connected to the other element, a third friction member slidably secured to the housing coacting with the second friction member, means for resiliently opposing relative movement between the second and third friction members, and means rotatable with the housing and projecting externally thereof for varying the contacting pressure of the friction members.

6. In a clutch for connecting a driving element to a driven element, the combination of a friction member adapted to be secured to one element, a second friction member coacting with the first member, a housing for the members adapted to be operatively connected to the other element, a third friction member slidably secured to the housing coacting with the second friction member, means for resiliently opposing relative movement between the second and third friction members, and centrifugal weights pivoted on the housing adapted to increase the pressure between all of the members as the speed of the housing is increased.

7. In a clutch for connecting a driving element to a driven element, the combination of a friction member adapted to be secured to one of said elements, a second friction member coacting with the first member, a third friction member coacting with the second member, a housing for all friction members, said third member being secured to the housing by axially slidable projections, said second member being resiliently secured to the housing by spring members adapted to limit relative movement therebetween, and said housing being adapted to be connected to the other of said elements.

8. In a clutch for connecting a driving element to a driven element, the combination of a friction member adapted to be secured to one of said elements, a second friction member coacting with the first member, a third friction member coacting with the second member, a housing for all friction members, said third member being secured to the housing by axially slidable projections, said second member being resiliently secured to the housing by spring members adapted to limit relative movement therebetween, said housing being adapted to be connected to the other of said elements, and centrifugal weights on said housing adapted to increase the pressure of all members as the speed of the housing is increased.

9. In a clutch for connecting a driving element to a driven element, the combination of a disc adapted to be secured to one of said elements, a pair of annular friction rings slidably disposed on opposite sides of said disc, a housing rotatable with respect to said rings, said housing having a radial wall contacting the outer face of one of said rings, an annular pressure member axially slidable in the housing toward the rings and rotatable with the housing, spring means resiliently connecting the rings to the housing, and means for varying the pressure of the rings against the disc by sliding the pressure member toward the housing wall.

10. In a clutch for connecting a driving element to a driven element, the combination of a disc adapted to be secured to one of said elements, a pair of annular friction rings slidably disposed on opposite sides of said disc, a housing rotatable with respect to said rings, said housing having a radial wall contacting the outer face of one of said rings, an annular pressure member axially slidable in the housing toward the rings and rotatable with the housing, spring means resiliently connecting the rings to the housing, and centrifugal weights pivotally mounted on the housing adapted to slide the pressure member to increase the friction between the rings and disc as the speed of the housing is increased.

11. In a clutch for connecting a driving element to a driven element, the combination of a plurality of friction members for connecting the elements, including two pairs of contacting frictional surfaces of different torque capacities arranged in tandem, means for limiting relative movement between the surfaces of less torque capacity, and means responsive to the speed of the driven element for increasing the torque capacity of both pairs of the frictional surfaces with an increase in the speed of the driven element.

12. In a clutch for connecting a driving element to a driven element, the combination of a friction disk, a housing having friction surfaces on opposite sides of the disk, a floating member interposed between the disk and each of the surfaces, having limited movement relative to the housing, the floating members having different frictional contact with the housing than with the disk, and means for resiliently opposing movement of the floating members relative to the shaft.

13. In a clutch for connecting a driving element to a driven element, cooperative friction members adapted to be connected to the driving and driven elements respectively, additional friction members arranged in tandem with the first mentioned members, said additional frictional members having friction coefficients of less value than those of the first mentioned friction members and having limited relative movement with respect to the first mentioned friction members for dampening vibration, and centrifugal means rotatable with the clutch for clamping all of said friction members together.

14. In a clutch for connecting a driving element to a driven element, the combination of driving and driven friction members, said members having two pairs of friction surfaces of different torque capacities arranged in tandem, means for limiting relative rotative movement of the surfaces having the less torque capacity, and centrifugal weights rotatable with the driven members and responsive to the speed thereof, said weights being arranged to force all of the friction members together and increase the torque capacity of both pairs of surfaces when the speed of the driven members is increased.

DAVID GREGG.